(12) United States Patent
Kojima et al.

(10) Patent No.: US 8,619,278 B2
(45) Date of Patent: Dec. 31, 2013

(54) PRINTED MATTER EXAMINATION APPARATUS, PRINTED MATTER EXAMINATION METHOD, AND PRINTED MATTER EXAMINATION SYSTEM

(75) Inventors: Keiji Kojima, Kanagawa (JP); Hitoshi Itoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 475 days.

(21) Appl. No.: 12/926,474

(22) Filed: Nov. 19, 2010

(65) Prior Publication Data

US 2011/0134458 A1 Jun. 9, 2011

(30) Foreign Application Priority Data

Dec. 4, 2009 (JP) .................................. 2009-276682
Oct. 20, 2010 (JP) .................................. 2010-235543

(51) Int. Cl.
*G06K 15/00* (2006.01)
*G06F 3/12* (2006.01)

(52) U.S. Cl.
USPC ........ 358/1.14; 358/1.11; 358/1.15; 358/1.18

(58) Field of Classification Search
USPC .............................. 358/1.14, 1.11, 1.15, 1.18
See application file for complete search history.

(56) References Cited

U.S. PATENT DOCUMENTS

| 5,594,840 | A | 1/1997 | Sahay et al. |
| 6,996,280 | B1 | 2/2006 | Matsukawa et al. |
| 7,123,742 | B2 | 10/2006 | Chang |
| 7,665,400 | B2 | 2/2010 | Duke |
| 2007/0165267 | A1 * | 7/2007 | Fransazov .................... 358/1.15 |

FOREIGN PATENT DOCUMENTS

| CN | 1469294 | 1/2004 |
| CN | 101151153 | 3/2008 |
| JP | 07-098639 | 4/1995 |
| JP | 2923004 | 4/1999 |
| JP | 2001-096872 | 4/2001 |

OTHER PUBLICATIONS

European Search Report dated Aug. 14, 2012 issued in European Application No. 10252053.3.
Chinese Office Action dated Aug. 2, 2012 issued in Chinese Application No. 201010571904.1.
Abstract of JP 04-098586 published on Mar. 31, 1992.

* cited by examiner

*Primary Examiner* — Fred Guillermety
(74) *Attorney, Agent, or Firm* — Harness, Dickey & Pierce

(57) ABSTRACT

A printed matter examination apparatus includes a master data acquiring unit configured to acquire master data that is data for printing and contains code information that is converted for printing; a code information acquiring unit configured to acquire unconverted code information; a code information recognition unit configured to recognize the converted code information from the acquired master data; and a code information examination unit configured to compare the converted code information recognized by the code information recognition unit with the acquired unconverted code information and determine that the converted code information is incorrect when the converted code information is not identical to the unconverted code information.

14 Claims, 15 Drawing Sheets

| TYPE | CODE INFORMATION | POSITION INFORMATION (UPPER LEFT), (LOWER RIGHT) |
|---|---|---|
| CHARACTERS (ADDRESS) | YOKOHAMA CITY ○○ | (X1, Y1), (X2, Y2) |
| CHARACTERS (FIRST AND LAST NAMES) | TARO RICOH | (X3, Y3), (X4, Y4) |
| BARCODE | 12345 | (X5, Y5), (X6, Y6) |
| PHOTO IMAGE | 123 | (X7, Y7), (X8, Y8) |

| TYPE | CODE INFORMATION | POSITION INFORMATION (UPPER LEFT), (LOWER RIGHT) |
|---|---|---|
| CHARACTERS (ADDRESS) | YOKOHAMA CITY ○○ | (X1, Y1), (X2, Y2) |
| CHARACTERS (FIRST AND LAST NAMES) | TARO RICOH | (X3, Y3), (X4, Y4) |
| BARCODE | 12345 | (X5, Y5), (X6, Y6) |
| PHOTO IMAGE | 123 | (X7, Y7), (X8, Y8) |

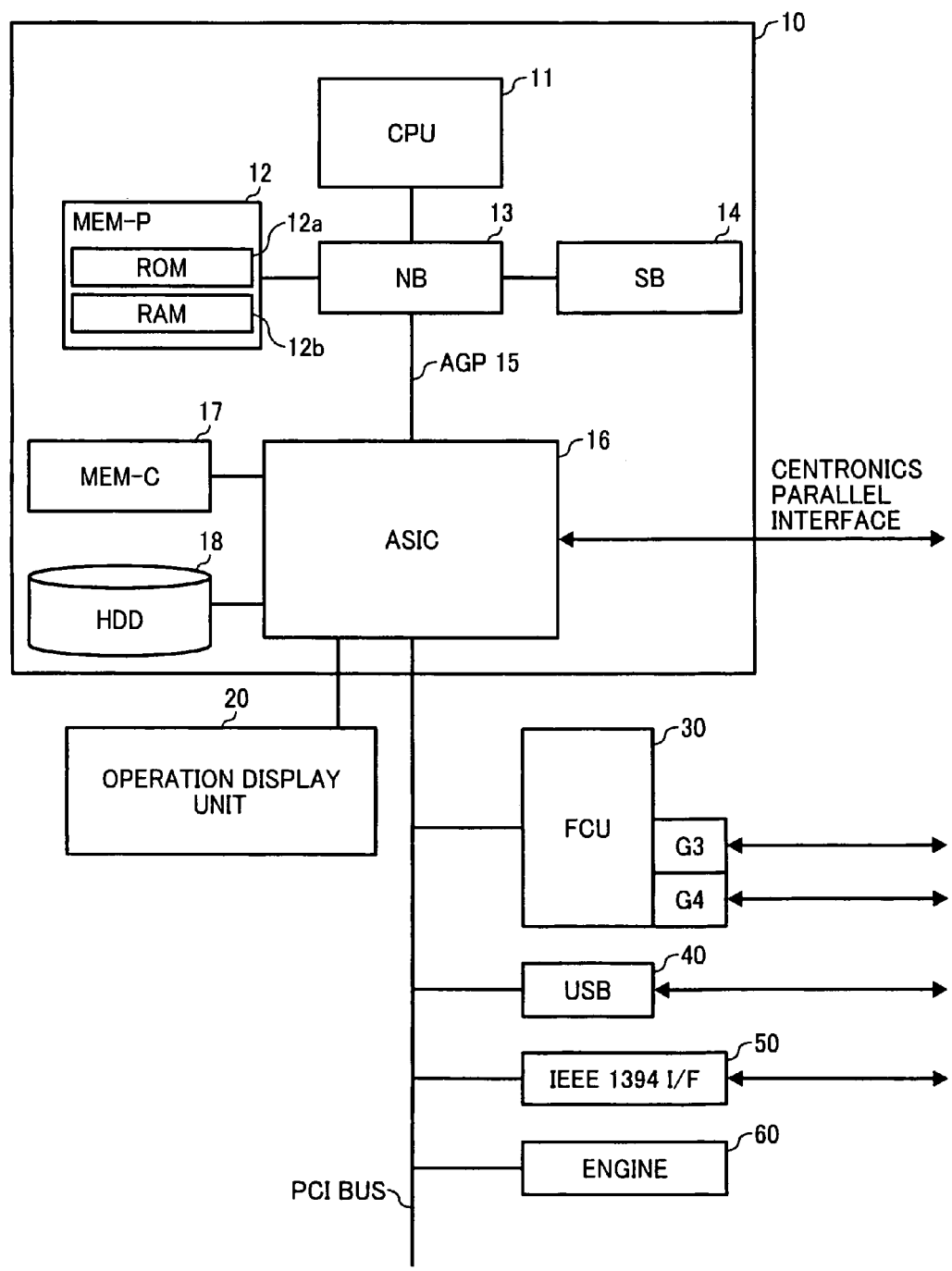

PRINTED MATTER EXAMINATION APPARATUS, PRINTED MATTER EXAMINATION METHOD, AND PRINTED MATTER EXAMINATION SYSTEM

CROSS-REFERENCE TO RELATED APPLICATIONS

The present application claims priority to and incorporates by reference the entire contents of Japanese Patent Application No. 2009-276682 filed in Japan on Dec. 4, 2009 and Japanese Patent Application No. 2010-235543 filed in Japan on Oct. 20, 2010.

BACKGROUND OF THE INVENTION

1. Field of the Invention

The present invention relates to a printed matter examination apparatus, a printed matter examination method, and a printed matter examination system.

2. Description of the Related Art

In conventional variable data printing (VDP) for successively printing pages whose content may be changed from one page to the next, particularly, it is required that printed matter be examined accurately and abnormalities be notified as promptly as possible in order to stop printing, thereby preventing toner or ink being wasted and paper being wasted. For this reason, examination apparatuses have been proposed that examine whether a necessary content is correctly printed on a printed matter printed by a printing apparatus.

For example, a technology is known in which image data of a printed matter, which is data that is an original to be printed, is used as reference data, image data obtained by reading a printed matter using a reading sensor is used as examination data, and the reference data and the examination data are compared with each other in order to examine the printing state. A technology is also well known already in which examination data is recognized by optical character recognition (OCR) and converted into character codes, and the character codes are compared with digital data that is the original of the reference data in order to examine the printed content.

Specifically, a printed matter is read by a bitmap-matching scanner, and the read data is collated with bitmap data, which is used for printing in a bitmap examination unit, per bitmap in order to examine the printing quality. In the examination method, an OCR scanner reads a character area of a printed matter and a character examination unit recognizes characters and examines the printed content. A picture examination scanner reads a picture area of the printed matter and a picture examination unit recognizes a picture and examines the content. In addition, a barcode reader scanner reads a barcode on the printed matter and a barcode examination unit examines the barcode data. Such printed matter examination apparatuses have been disclosed (see Japanese Patent Application Laid-open No. 2001-96872).

Image generating apparatuses have been also proposed that promptly identify broken, lightly-printed, or slurred portions in liner portions of an image, which may be the main cause of erroneous recognition in character recognition, or promptly identify the occurrence of image noise in a writing system, and compare the characters separated from frame lines with a pre-stored character portion correct pattern in order to remove the cause of erroneous recognition beforehand (see Japanese Patent No. 2923004).

Conventional examination devices for conventional variable data printing, however, merely perform an examination by comparing a printed matter having been printed with reference data. Specifically, the content of a printed matter may contain an abnormality, such as incorrect conversion of characters caused during a process of converting digital data into image data for printing, or contain noises caused while the printed matter is printed. Nonetheless, because an examination is performed after a printed matter is output, an abnormality in an RIP (raster image processor) occurring in an earlier printing step cannot be examined during an earlier stage.

As described above, sending erroneous image data processed by the RIP to a printing apparatus results in a waste of toner or ink and a waste of paper and furthermore requires reprinting of erroneous pages and replacement operations, which leads to a problem of lowering the operation efficiency and damaging the environment.

The present invention is made to solve the above problems. Objectives of the present invention are to provide a printed matter examination apparatus that can perform a misprinting examination before printing, a printed matter examination method, and a printed matter examination system.

SUMMARY OF THE INVENTION

It is an object of the present invention to at least partially solve the problems in the conventional technology.

According to an aspect of the present invention, there is provided a printed matter examination apparatus that includes a master data acquiring unit configured to acquire master data that is data for printing and contains code information that is converted for printing; a code information acquiring unit configured to acquire unconverted code information; a code information recognition unit configured to recognize the converted code information from the acquired master data; and a code information examination unit configured to compare the converted code information recognized by the code information recognition unit with the acquired unconverted code information and determine that the converted code information is incorrect when the converted code information is not identical to the unconverted code information.

According to an another aspect of the present invention, there is provided a printed matter examination method that includes acquiring master data that is data for printing and contains code information that is converted for printing; acquiring unconverted code information; recognizing the converted code information from the acquired master data; and comparing the converted code information recognized at the recognizing with the acquired unconverted code information and determining that the converted code information is incorrect when the converted code information is not identical to the unconverted code information.

According to still another aspect of the present invention, there is provided a printed matter examination system that includes a server and a printing apparatus. The server includes a master data acquiring unit configured to acquire master data that is data for printing and contains code information that is converted for printing; a code information acquiring unit configured to acquire unconverted code information; a code information recognition unit configured to recognize the converted code information from the acquired master data; and a code information examination unit configured to compare the converted code information recognized by the code information recognition unit with the acquired unconverted code information and determine that the converted code information is incorrect when the converted code information is not identical to the unconverted code information. The printing apparatus includes an examination data acquiring unit configured to acquire examination data that is an image data obtained by capturing an image of a recording medium on which the master data is printed; and a printing state examination unit configured to compare the acquired examination data with the master data and determine that the examination data is incorrect when the examination data is not identical to the master data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a block diagram of the hardware configuration of a multi-functional apparatus including a printed matter examination apparatus.

DETAILED DESCRIPTION OF THE PREFERRED EMBODIMENTS

Preferred embodiments of a printed matter examination system according to the present invention will be described in detail below with reference to the accompanying drawings.

First Embodiment

Figure 1:
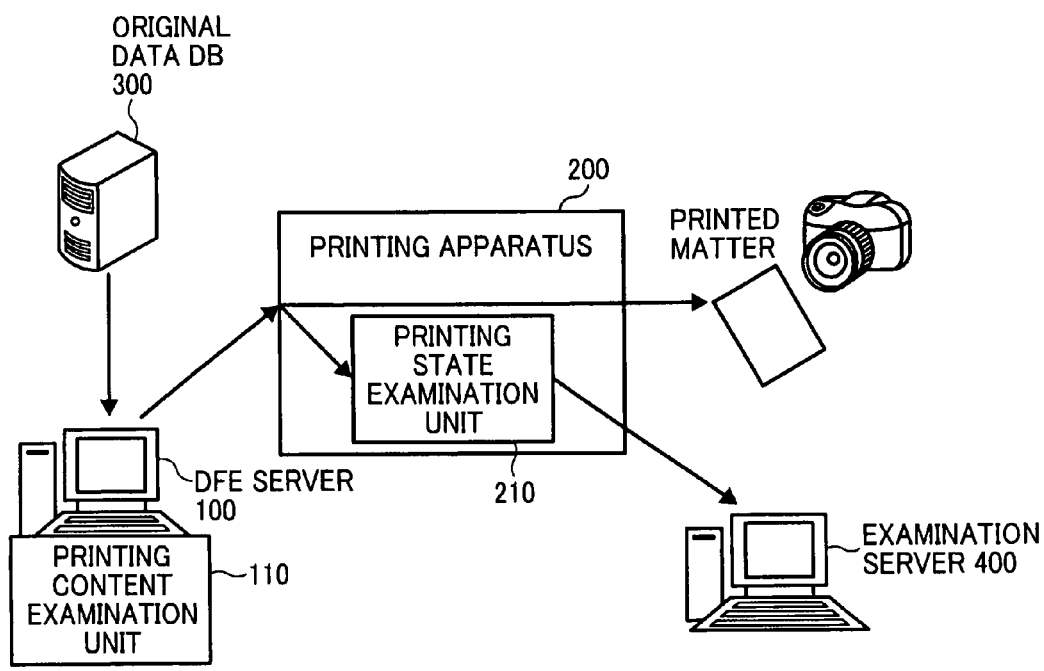
FIG. 1 is a schematic diagram of a printed matter examination system according to a first embodiment of the present invention.

FIG. 1 is a schematic diagram of a printed matter examination system according to a first embodiment of the present invention. As shown in FIG. 1, the printed matter examination system includes a DFE (digital front end) server 100, a printing apparatus 200, an original data DB (data base) 300, and an examination server 400, which are all connected via a network.

The DFE server 100 is a server that generates bitmap data for printing and transmits the generated bitmap data and a printing instruction to the printing apparatus 200. The DFE server 100 includes a printing content examination unit 110 that examines the printing content of the bitmap data for printing. The printing content used herein is variable data out of print data that is divided into invariable data corresponding to the fixed background and variable data that is individually input with respect to each printed matter.

The printing apparatus 200 is an apparatus that prints the bitmap data for printing. The printing apparatus 200 includes a printing state examination unit 210 that examines the printing state. The printing state is the state of a finished printed matter. The printing apparatus 200 captures an image of a printed matter using an imaging device, such as a camera, and acquires data to be examined by the printing state examination unit 210.

The original data DB 300 stores therein the original data according to data type. The original data is data that is the original of the printing content. The examination server 400 notifies a user of the results of examinations by the printing content examination unit 110 and the printing state examination unit 210.

Figure 2:
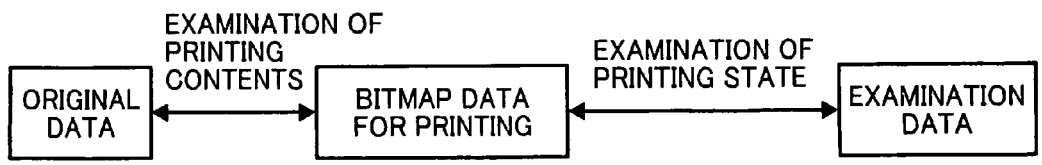
FIG. 2 is a diagram of an overview of the flow of a printed matter examination process of the printed matter examination system according to the first embodiment.

FIG. 2 is a diagram of an overview of the flow of a printed matter examination process of the printed matter examination system according to the first embodiment. As illustrated in FIG. 2, the printing content examination unit 110 collates the bitmap data for printing with the original data that is acquired from the original data DB 300 and examines the printing content. The printing state examination unit 210 examines the printing state by collating the data read from a print with the bitmap data for printing.

Figures 3, 4:
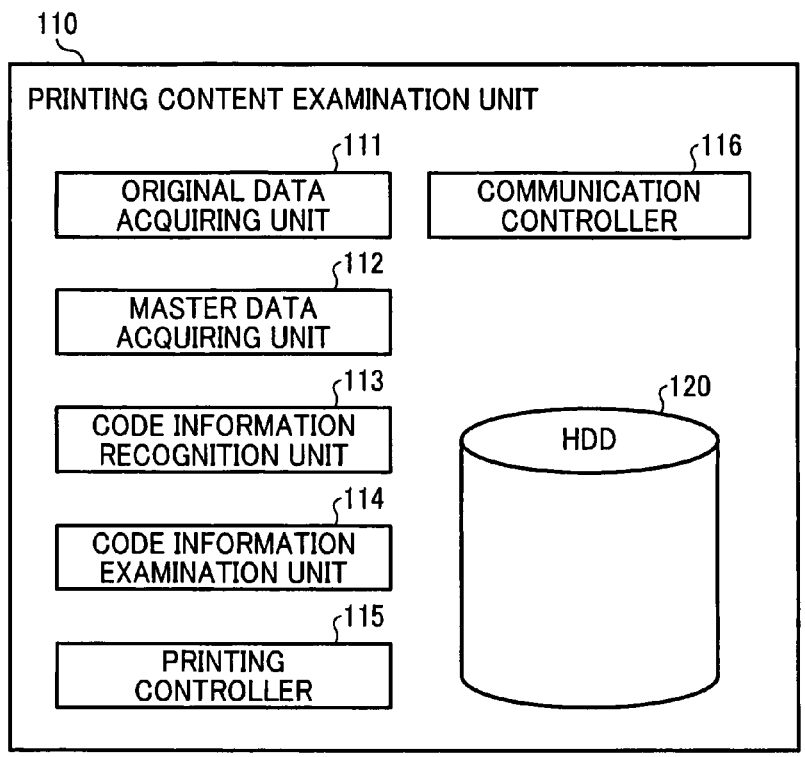
FIG. 3 is a block diagram of the configuration of a printing content examination unit according to the first embodiment.
FIG. 4 is a table giving an example of original data.

FIG. 3 is a block diagram of the configuration of the printing content examination unit 110 according to the first embodiment. As illustrated in FIG. 3, the printing content examination unit 110 includes an original data acquiring unit 111, a master data acquiring unit 112, a code information recognition unit 113, a code information examination unit 114, a printing controller 115, a communication controller 116, and an HDD (hard disk drive) 120.

The original data acquiring unit 111 acquires the original data from the original data DB 300. FIG. 4 is a table giving an example of the original data. As illustrated in FIG. 4, the original data is stored in the original data DB 300 according to data type. As shown in FIG. 4, the types include characters (address), characters (first and last names), a barcode, and a photo image. Code information and position information are associated with the types. The code information is information that uniquely identifies each type of data. The code information may be, for example, as represented in FIG. 4, characters representing a street address and first and last names, the numbers of the barcode, or the ID of photo-image data. As photo-image data, image data associated with an ID is saved in the original data DB 300 beforehand. Similarly, as characters or a barcode, converted image data may be saved beforehand. In this case, similar to the photo-image data, the IDs associated with the converted image data of the characters and the barcode are registered as code information. The position information contains coordinates representing the position of each data to be laid out in the master data.

The master data acquiring unit 112 acquires the master data. The master data is data that is the original to be printed. For example, the master data acquiring unit 112 generates master data by laying out the original data processed by the RIP (hereinafter, RIP original data) on the invariable data of the print data. The RIP original data is image data obtained by converting the original data, which is acquired by the original data acquiring unit 111, with the RIP.

Figure 5:
FIG. 5 is a diagram giving an example of master data.

FIG. 5 is a diagram giving an example of master data. FIG. 5 illustrates the master data generated by laying out the RIP original data with the master data acquiring unit 112 according to the position information. As shown in FIG. 5, the original data of the address, the first and last names, the barcode, and the photo image represented in FIG. 4 are processed by the RIP. Instead of acquiring the master data by generating it, the master data acquiring unit 112 may acquire master data by receiving already-generated master data.

The HDD 120 stores therein a recognition dictionary that is used by a character recognition unit 132 to recognize characters by matching. For example, as a recognition dictionary according to the font type, there is an MS-Mincho-font recognition dictionary generated using only characters of the MS Mincho font. As a recognition dictionary according to character size, there is a reduced-size recognition dictionary generated using only characters smaller than a predetermined size and an enlarged-size recognition dictionary generated using only characters larger than a predetermined size. Furthermore, as a recognition dictionary corresponding to character codes, there is a character code recognition dictionary generated using only character codes.

The HDD 120 stores therein a code recognition dictionary used for recognizing a barcode by matching. For example, a CODE-39 recognition dictionary is stored as a code recognition dictionary dedicated to the CODE 39 that is a type of barcode. The HDD 120 may store code recognition dictionaries each corresponding to each code type, such as a one-dimensional code or a two-dimensional code.

Figure 6:
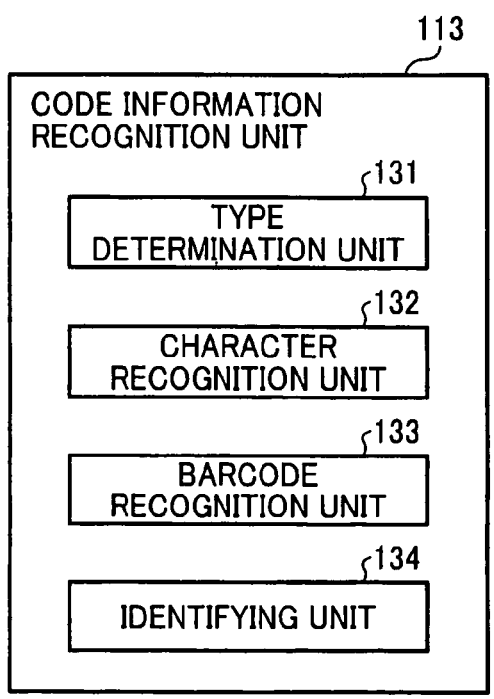
FIG. 6 is a functional block diagram of a code information recognition unit.

The code information recognition unit 113 recognizes code information from the master data that is acquired by the master data acquiring unit 112. FIG. 6 is a functional block diagram of the code information recognition unit 113. As illustrated in FIG. 6, the code information recognition unit 113 includes a type determination unit 131, the character recognition unit 132, a barcode recognition unit 133, and an identifying unit 134.

The type determination unit 131 determines the type of an area to be recognized (hereinafter, "target area") of the master data according to the type information contained in the original data and selects a specific recognition process according to the determined type. The target area is an area represented in the position information or an area to be recognized according to type of code information contained in the original data. Specifically, when the type determination unit 131 determines that the type of the target area is characters, a character recognition process is selected. When the type determination unit 131 determines that the type of the target area is a barcode, a barcode recognition process is selected. When the type determination unit 131 determines that the type of the target area is another area to be identified by another element other than characters and a barcode, an identifying process corresponding to the target area to be recognized is selected.

When the type determination unit 131 determines that the type of a target area is characters, the character recognition unit recognizes the characters by OCR (optical character recognition). For example, when the type determination unit 131 determines that the type of a target area is characters, the character recognition unit 132 may acquire the recognition dictionary suitable for the characters from the HDD 120 and recognize the characters of the target area by matching the characters by the recognition dictionary.

The character recognition unit 132 may perform a preprocessing suitable for character recognition and then recognize the characters. For example, when the size of the characters determined with respect to the target area is not equal to that of the font in the recognition dictionary stored in the HDD 120, the character recognition unit 132 may perform matching after enlarging or reducing the master data to make the size of the characters in the target area equal to that of the recognition dictionary stored in the HDD 120.

When character codes are contained in the target area, the character recognition unit 132 may extract only the character codes contained in the target area and then perform matching. As described above, by registering beforehand recognition dictionaries that may be information of the original data, the information of the original data can be used for character recognition, which increases accuracy when recognizing data.

When the type determination unit 131 determines that the type of the target area is a barcode, the barcode recognition unit 133 recognizes the barcode by reading it. For example, when the target area contains the barcode generated according to the CODE 39, the barcode recognition unit 133 acquires the CODE-39 recognition dictionary from the HDD 120 and matches the barcode, which is contained in the original data, with the CODE-39 recognition dictionary. In this case, if a code recognition dictionary of a type the same as that of the barcode contained in the target area is not stored in the HDD 120, the barcode recognition unit 133 may perform matching after reducing or enlarging the barcode contained in the target area that is accordingly applicable to the code recognition dictionary stored in the HDD 120.

When the type determination unit 131 determines that the type of the target area is other than characters or a barcode, the identifying unit 134 performs an identifying process corresponding to the target area to be recognized. For example, when the target area is a photo image, the identifying unit 134 searches for a similar image. When the target area is image data other than a photo image, the identifying unit 134 makes a comparison of pixels.

The identifying process corresponding to the target area to be identified is performed on an area indicated by the position information contained in the original data. In another example, a process may be performed in which the type and position of the area are automatically determined not according to the position information contained in the original data.

The code information examination unit 114 examines code information that is recognized by the code information recognition unit 113. For example, the code information examination unit 114 collates the recognized code information with the code information contained in the original data. When the recognized code information and the code information contained in the original data are identical, the code information examination unit 114 determines that the code information is correct. In contrast, when the recognized code information and the code information contained in the original data are not identical, the code information examination unit 114 determines that the code information is incorrect.

For example, when the character recognition unit 132 recognizes characters, the code information examination unit 114 makes a comparison of character codes. When the barcode recognition unit 133 identifies a barcode, the code information examination unit 114 makes a comparison of barcodes. When the identifying unit 134 identifies a photo image, the code information examination unit 114 searches for an image similar to that in the photo image area and compares the ID of the similar image with the ID of the code information.

When the identifying unit 134 recognizes image data other than a photo image, the code information examination unit 114 recognizes and examines the image data by comparing pixels of the RIP original data with those of the image data that is saved in the original data DB 300. In this case, the code information examination unit 114 compares the difference between the pixels of the original data and those of the image data saved in the original data DB 300 with a predetermined threshold. When the difference is equal to or less than the threshold, the code information examination unit 114 determines that the RIP original data is correct. When the difference exceeds the threshold, the code information examination unit 114 determines that the RIP original data is incorrect.

When the code information examination unit 114 determines that the code information is correct, the printing controller 115 determines that the master data is correct and sends the master data to the printing apparatus 200.

When the code information examination unit 114 determines that the code information is incorrect, the printing controller 115 determines that the master data is incorrect and cancels transmission of the master data to the printing apparatus 200.

In this case, the printing controller 115 determines that an error, such as character corruption, has occurred while the master data acquiring unit 112 was generating the master data from the original data. The printing controller 115 cancels transmission of the master data and keeps the fact that an error has occurred in a log. As an alternative configuration, a predetermined volume of data is stored, and, after the user is notified of an error(s), only data determined to be correct is printed.

The communication controller 116 communicates with the original data DB 300 and the printing apparatus 200 and transmits and receives information, such as the original data and the master data.

Figure 7:
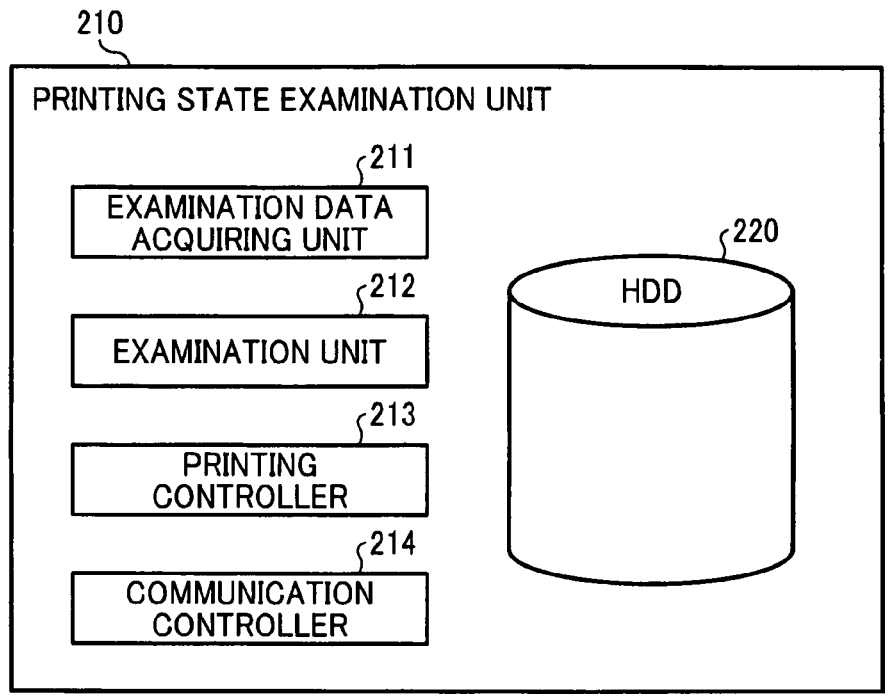
FIG. 7 is a block diagram of the configuration of a printing state examination unit according to the first embodiment.

FIG. 7 is a block diagram of the configuration of the printing state examination unit 210 according to the first embodiment. As illustrated in FIG. 7, the printing state examination unit 210 includes an examination data acquiring unit 211, an examination unit 212, a printing controller 213, a communication controller 214, and an HDD 220.

Figure 8:
FIG. 8 is a diagram giving an example of examination data.

The examination data acquiring unit 211 acquires image data to be examined (hereinafter, examination data) that is obtained by capturing an image of a printed matter, which is printed by the printing apparatus 200, using a reading sensor, such as a camera or a scanner. The reading sensor may be arranged outside the printing apparatus 200 as shown in FIG. 1 or may be arranged in the printing apparatus 200. FIG. 8 is a diagram giving an example of the examination data. FIG. 8 shows the examination data obtained by capturing an image of the printed matter, which is obtained by printing the master data in FIG. 5, using the reading sensor.

The examination unit 212 examines the printing state of the generated examination data. Specifically, the examination unit 212 extracts the feature from each of the examination data and the master data, calculates the value of the difference between the feature of the examination data and the feature of the master data, and determines whether the value of the difference is equal to or less than a predetermined threshold. When the value of the difference is equal to or less than the predetermined threshold, the examination unit 212 determines that the examination data is correct. When the value of the difference exceeds the predetermined threshold, the examination unit 212 determines that the examination data is incorrect. For example, the pixel value may be used as the feature. In this case, the examination unit 212 extracts the pixel value from each of the examination data and the master data. When the value of the difference between the pixel value of the examination data and the pixel value of the master data is equal to or less than the predetermined threshold, the examination unit 212 determines that the examination data is correct, and when the value of the difference exceeds the predetermined threshold, the examination unit 212 determines that the examination data is incorrect.

When the examination unit 212 determines that the examination data is correct, the printing controller 213 continues the printing process. When the examination unit 212 determines that the examination data is incorrect, the printing controller 213 stops the printing process. The printing controller 213 also transmits the information on the position of the pixels determined to be incorrect to the examination server 400 via the communication controller 214. The examination server 400 stores and saves the position information of the pixels that are determined to be incorrect.

The communication controller 214 communicates with the DFE server 100 and the examination server 400 and transmits and receives information.

Figure 9:
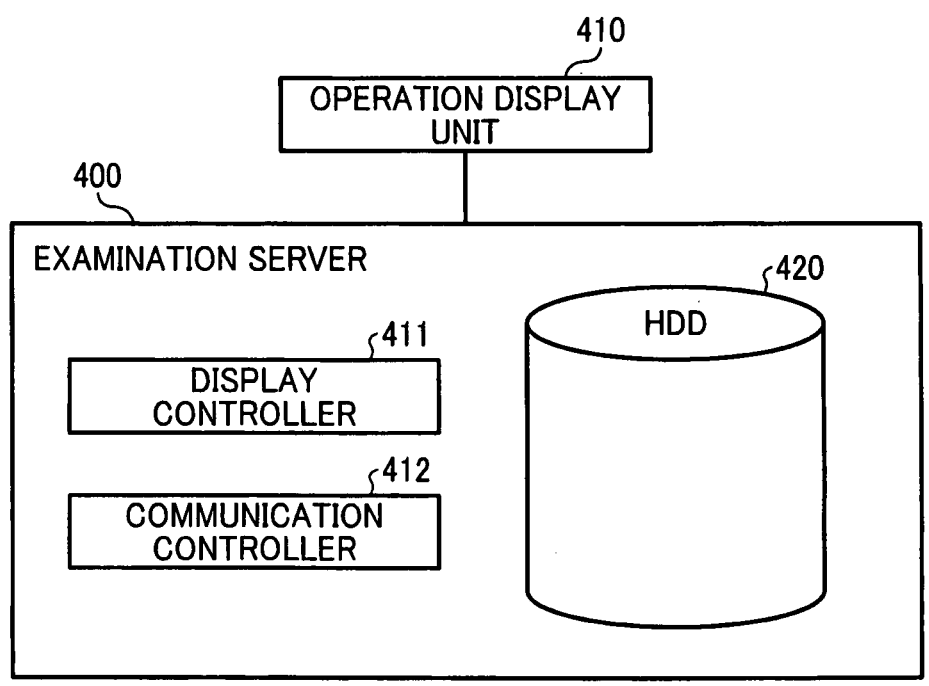
FIG. 9 is a block diagram of the configuration of an examination server according to the first embodiment.

FIG. 9 is a block diagram of the configuration of the examination server 400 according to the first embodiment. As illustrated in FIG. 9, the examination server 400 includes an operation display unit 410, a display controller 411, a communication controller 412, and an HDD 420.

The display controller 411 displays the position information on the pixels determined to be incorrect, which is received from the printing apparatus 200, on the operation display unit 410. The communication controller 412 communicates with the printing apparatus 200 to transmit and receives information. The HDD 420 saves the position information on the pixels determined to be incorrect as logs.

Figure 10:
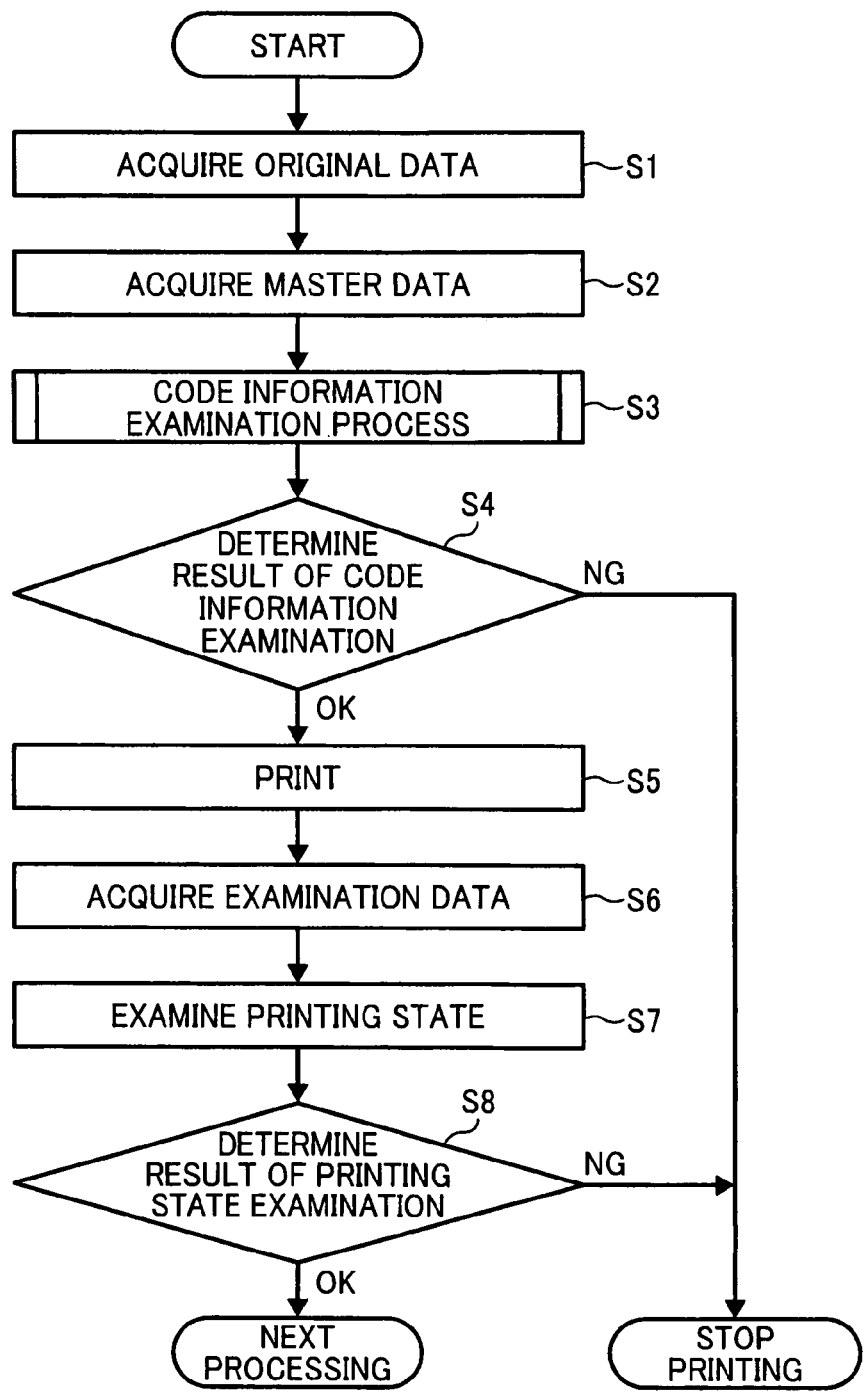
FIG. 10 is a flowchart of a procedure of the printed matter examination process of the printed matter examination system according to the first embodiment.

The flow of the printed matter examination process of the printed matter examination system configured as described above will be described below. FIG. 10 is a flowchart of a procedure of the printed matter examination process of the printed matter examination system according to the first embodiment.

The original data acquiring unit 111 acquires the original data from the original data DB 300 (step S1). The master data acquiring unit 112 acquires the master data (step S2). The code information examination unit 114 examines the code information with the code information examination process (step S3).

Figure 11:
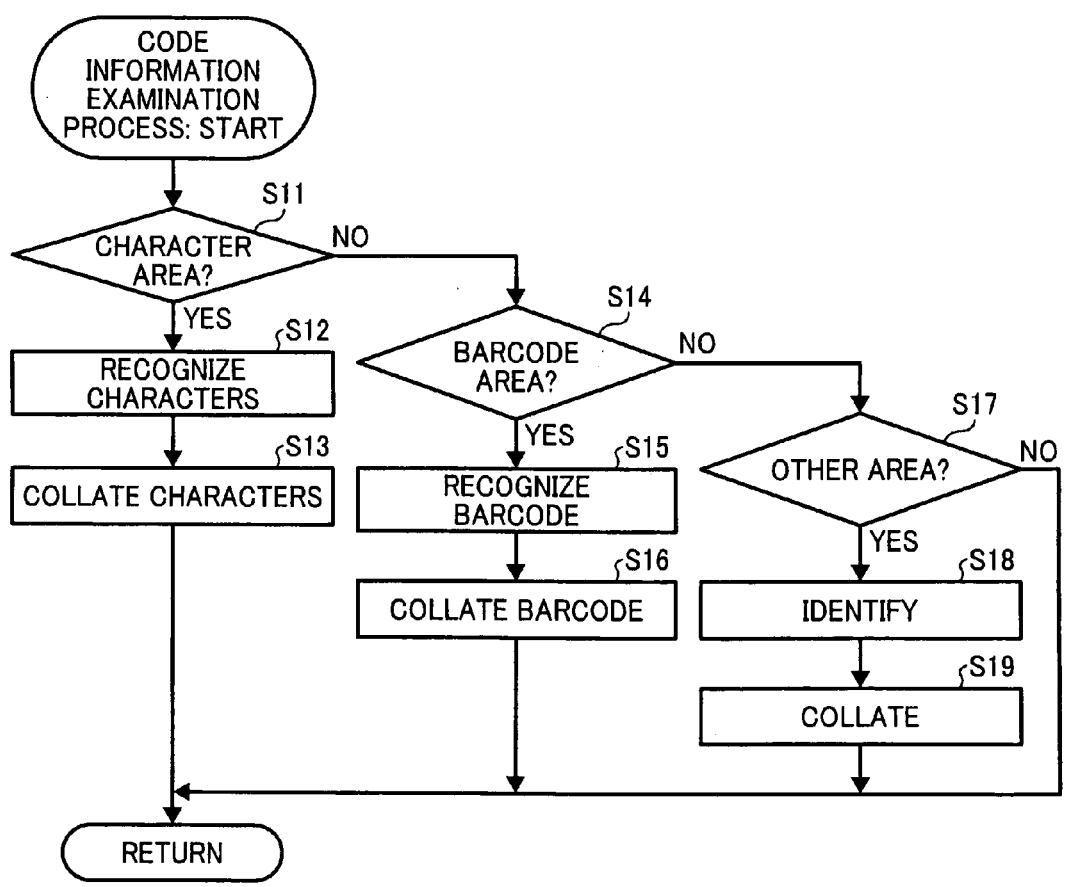
FIG. 11 is a flowchart of a procedure of a code information examination process.

The code information examination process is described here. FIG. 11 is a flowchart of a procedure of the code information examination process. The type determination unit 131 determines whether the type of a target area to be identified is a character area (step S11). When the type determination unit 131 determines that the target area is a character area (YES at step S11), the character recognition unit 132 recognizes the character by OCR (step S12). The code information recognition unit 113 collates the recognized characters with character codes contained in the original data (step S13).

When it is determined that the target area is not a character area at step S11 (NO at step S11), the code information recognition unit 113 determines whether the type of the target area to be recognized is a barcode area (step S14). When the code information recognition unit 113 determines that the target area is a barcode area (YES at step S14), the barcode recognition unit 133 reads the barcode using the barcode reader scanner to recognize the barcode (step S15). The code information recognition unit 113 collates the recognized barcode with the barcode contained in the original data (step S16).

When the code information recognition unit 113 determines that the target area is not a barcode area at step S14 (NO at step S14) and the identifying unit 134 determines that the target area is an area that is identified by elements other than characters and a barcode (YES at step S17), the identifying unit 134 performs an identifying process corresponding to the area to be identified (step S18). For example, when the area to be identified is a picture, the picture is read using a scanner for examining a picture and the picture is identified.

The code information recognition unit 113 collates the result of the identifying process with the code information of the original data (step S19). The flow of the code information examination process is repeated for each target area.

The process goes back to step S4 in FIG. 10, the code information examination unit 114 determines the result of the examination by the code information examination process (step S4). Specifically, it is determined whether the code information contained in the master data is identical to the code information contained in the original data in the code information examination process.

When the code information contained in the master data is identical to the code information contained in the original data, the master data is determined to be correct (OK at step S4) and the printing controller 115 prints the master data (step S5).

In contrast, when the code information contained in the master data is not identical to the code information contained in the original data, the master data is determined to be incorrect (NG at step S4), and the printing controller 115 cancels the printing. Accordingly, no examination of the printing state is conducted and the master data is excluded from the data to be examined.

At step S6, the examination data acquiring unit 211 acquires examination data (step S6). Specifically, examination data is acquired using a reading sensor, such as a camera or a scanner.

The examination unit 212 examines the printing state of the acquired examination data (step S7). Specifically, the difference between the pixels of the examination data and those of the master data is compared with the pre-set threshold. For example, when color data is printed, each RGB pixel value of 0 to 255 is compared between the examination data and the master data to calculate the value of the difference and the difference value is compared with the threshold.

The examination unit 212 determines the result of examining the printing state of the examination data (step S8). For example, when the pixel difference value obtained by the comparison does not exceed the threshold, the examination data is determined to be correct. In contrast, when the pixel difference value obtained by the comparison exceed the threshold, the examination data is determined to be incorrect. When the examination data is determined to be correct (OK at step S8) the process shifts to the next step.

In contrast, when the examination data is determined to be incorrect (NG at step S8), the printing controller 213 stops the printing. Specifically, the printing controller 213 transmits the position information on the pixels determined to be incorrect to the examination server 400. The examination server 400 causes the operation display unit 410 to display the error and saves the error in the log. At a time when examination of one page is completed, visualization may be performed by, for example, increasing the luminance of the incorrect pixels or reducing the luminance of the correct pixels and then displaying the incorrect portion.

Figure 12:
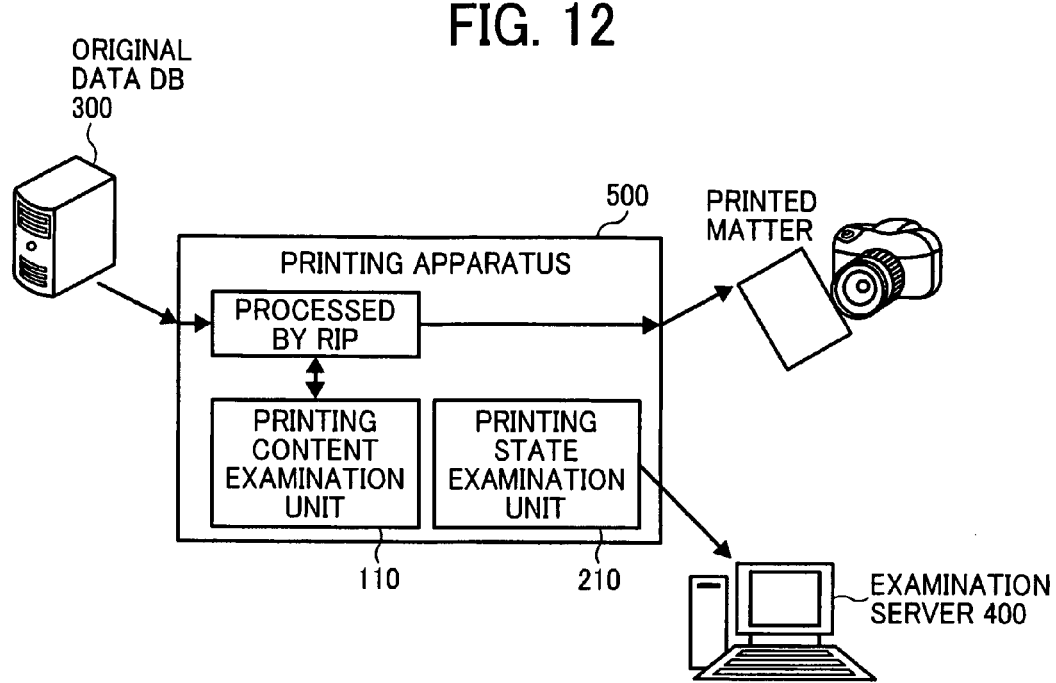
FIG. 12 is a schematic diagram giving an example of a printed matter examination apparatus.

In the first embodiment, the printing content examination unit 110 and the printing state examination unit 210 that are realized as a part of the printed matter examination system are described. As another example, a configuration may be employed in which the printing content examination unit 110 and the printing state examination unit 210 are realized as one printed matter examination apparatus. FIG. 12 is a schematic diagram giving an example of such a printed matter examination apparatus. As illustrated in FIG. 12, a printing apparatus 500 includes the printing content examination unit 110 and the printing state examination unit 210.

As described above, according to the first embodiment, because the printing content is examined prior to printing, the waste of resources due to misprinting can be eliminated.

In addition, as described above, according to the first embodiment, the printing state is examined prior to printing multiple printed matters of the same printed matter, the waste of resources due to misprinting can be eliminated and printing can be performed with efficiency.

In addition, as described above, according to the first embodiment, because each of the two steps of the examination of the printing content and the examination of the printing state can be individually focused when visually confirming the examination result, the confirmation operation can be performed easily with efficiency.

Second Embodiment

In the first embodiment, the code information that is recognized by OCR by the code information recognition unit 113 is examined as the printing examination by the printing content examination unit 110. In a second embodiment according to the present invention, the printing examination by the printing content examination unit is performed by examining the feature of original data of an original processed by an RIP (RIP original data) and the feature of the master data.

Figure 13:
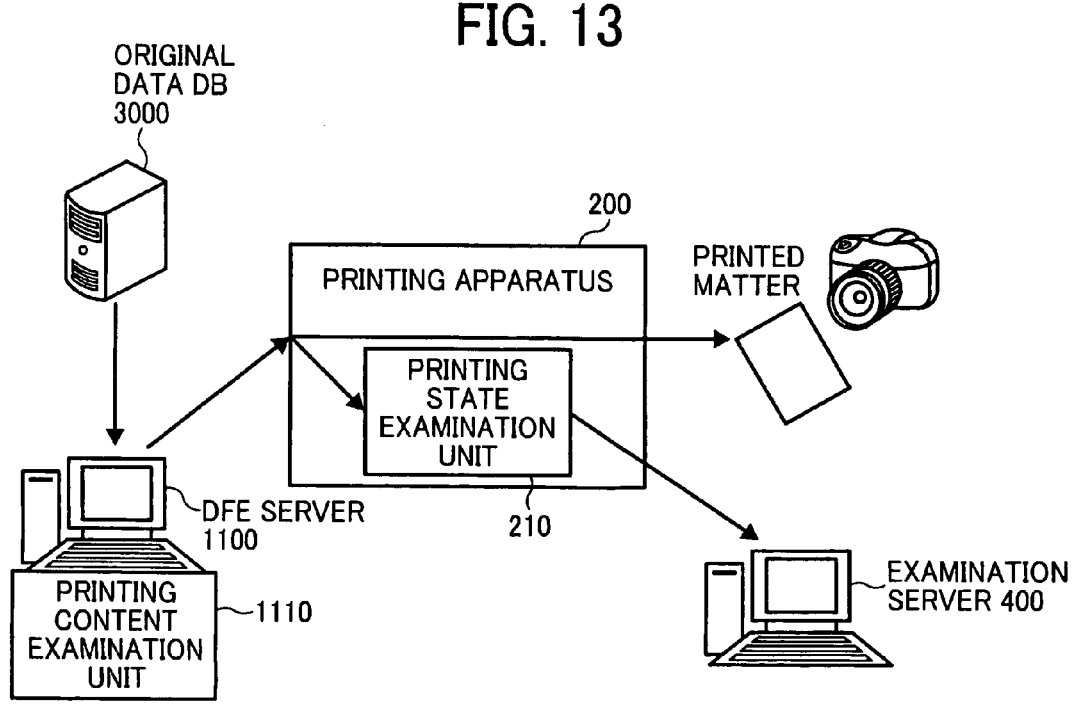
FIG. 13 is a schematic diagram of a printed matter examination system according to a second embodiment of the present invention.

FIG. 13 is a schematic diagram of a printed matter examination system according to the second embodiment. As illustrated in FIG. 13, the printed matter examination system includes a DFE server 1100, the printing apparatus 200, an original data DB 3000, and the examination server 400, which are all connected via a network. The configurations of the server and the devices other than the DFE server 1100 and the original data DB 3000 and the flow of the printed matter examination process of the printed matter examination system are similar to those of the first embodiment.

The original data DB 3000 stores therein the RIP original data. The RIP original data is data obtained by converting the original data using a method different from that for the master data. For example, the original data DB 3000 adds, to the RIP original data, an identifier for identifying the RIP original data and then stores the RIP original data.

The DFE server 1100 generates bitmap data for printing and transmits the generated bitmap data and a printing instruction to the printing apparatus 200. The DFE server 1100 includes a printing content examination unit 1110 that examines the printing content of the master data.

Figure 14:
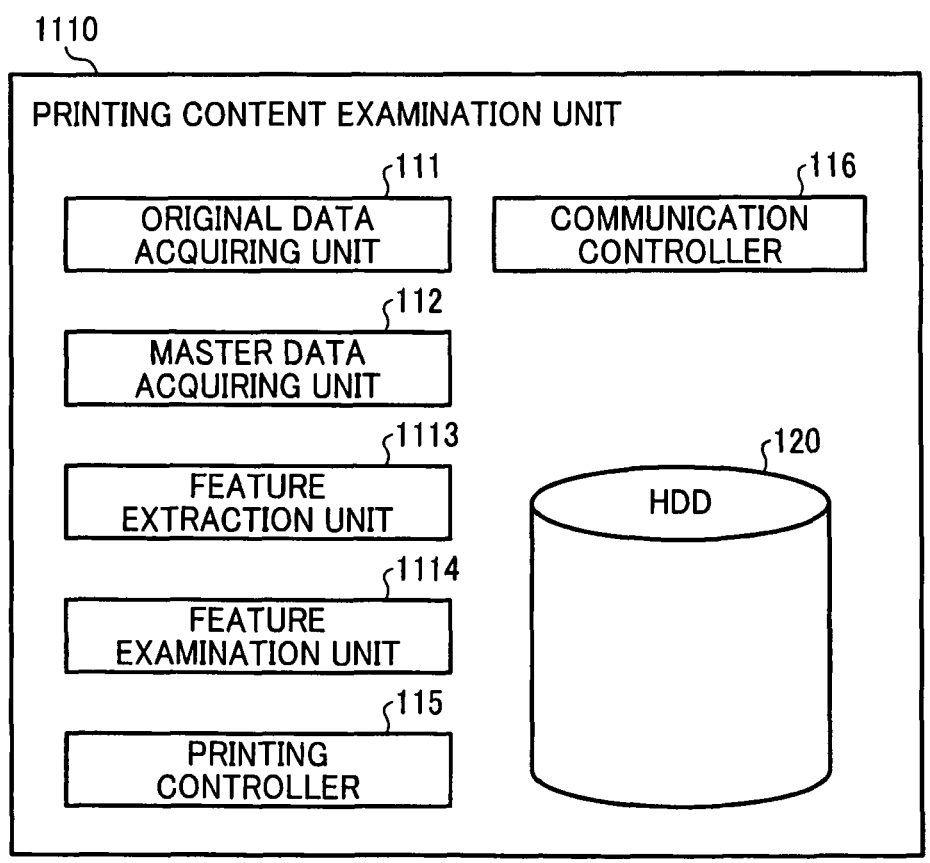
FIG. 14 is a block diagram of the configuration of a printing content examination unit according to the second embodiment.

FIG. 14 is a block diagram of the configuration of the printing content examination unit 1110 according to the second embodiment. As shown in FIG. 14, the printing content examination unit 1110 includes the original data acquiring unit 111, the master data acquiring unit 112, a feature extraction unit 1113, a feature examination unit 1114, the printing controller 115, the communication controller 116, and the HDD 120. The configuration and function of each unit other than the feature extraction unit 1113 and the feature examination unit 1114 are similar to those of the first embodiment.

The feature extraction unit 1113 extracts the feature from the RIP original data and the feature from the master data. For example, the feature examination unit 1114 extracts pixel values from each of the RIP original data and the master data as that feature. In the second embodiment, description will be provided using pixel values. However, the feature is not limited to pixel values, and it may be contour information containing the luminance and edges.

The feature examination unit 1114 obtains the value of the difference between the feature extracted from the image data of the RIP original data and the feature extracted from the image data of the master data. By determining whether the difference value is within the range of a predetermined threshold, it is determined by examination whether the original data is correct or incorrect. For example, when the value of the difference between the pixels extracted from the RIP original data and the pixels extracted from the master data is within the range of the predetermined threshold, the original data is determined to be correct. When the difference value is outside of the range of the threshold, the original data is determined to be incorrect.

The feature examination unit 1114 may determine that the original data is correct if any one of the difference values according to each pixel exceeds the threshold. For example, as an example of the case in which the original data is determined to be incorrect when any one of the difference values according to each pixel exceeds the threshold, the feature examination unit 1114 compares the pixel values of the RIP original data with the corresponding pixel values of the master data with respect to predetermined coordinates that are previously provided. The feature examination unit 1114 may compare pixel values of the whole original of the RIP original data and the corresponding pixel values of the whole original of the master data or may compare only pixel values of the coordinates representing only areas of which printing content is variable. The feature examination unit 1114 determines that the original data is incorrect when the value of the difference between pixels of the RIP original data and the pixels of the master data is outside of the range of the threshold. The determination is not limited to this method. The feature examination unit 1114 may determine that the original data is incorrect when the total of the difference values exceeds a threshold.

Note that the RIP original data image and the master data image are obtained by converting the original data into image data formats. Thus, dirt created during printing and noise caused when reading data using a reading sensor are not contained in the images. In other words, the original data image and the master data image have high quality and thus the threshold can be set to be less than that in the printing state examination unit 210. This increases accuracy when recognizing and examining data.

As another example of the feature examination unit 1114, when the value of the difference between the features is proximate to the border of the threshold, the difference value proximate to the border is determined to be neither correct nor incorrect and it is determined that a re-examination is required. In this case, the feature examination unit 1114 saves, in the HDD 120, a flag representing that a re-examination is required and position information. Specifically, the difference value proximate to the border is a difference value that is small in a pre-set range, a value of similarity that is output in character recognition and is small in a pre-set range, or a value of dissimilarity that is large in a pre-set range.

When the feature examination unit 1114 determines that the master data is required to be re-examined, the feature examination unit 1114 performs a re-examination. For example, the feature examination unit 1114 compares pixel values and compares the levels of the features with respect to only the area that is required to be re-examined. The feature examination unit 1114 determines, as correct areas, only areas determined to be correct according to the results of both of the comparisons.

As a modification of the feature examination unit 1114, the examination of master data by the code information examination unit 114 using code information in the first embodiment (first method) and the examination of master data using the features in the second embodiment (second method) may be combined.

For example, the feature examination unit 1114 determines that the original data is correct only when both of the results of the first and second methods represent that the original data is determined to be correct. Alternatively, the feature examination unit 1114 may determine that the original data is correct when any one of the results of the first and second methods represents that the original data is determined to be correct. When any one of the results represents that the original data is determined to be correct, the feature examination unit 1114 determines that a re-examination is required and then saves, in the HDD 120, a flag representing that a re-examination is required and position information.

In this case, a conclusion may be not drawn yet at the examination of the printing content, and information on the positions of portions determined to be incorrect according to the first and second methods may be passed to the printing state examination unit 210, and then the printing state examination unit 210 may make a final determination. The final determination is finally determining whether the original data is correct or incorrect. For example, the printing state examination unit 210 may compare pixels and compare levels of the features with respect to the area on which a re-examination is required and may determine, as correct areas, areas to be determined to be correct according to both of the results of the comparisons.

Figure 15:
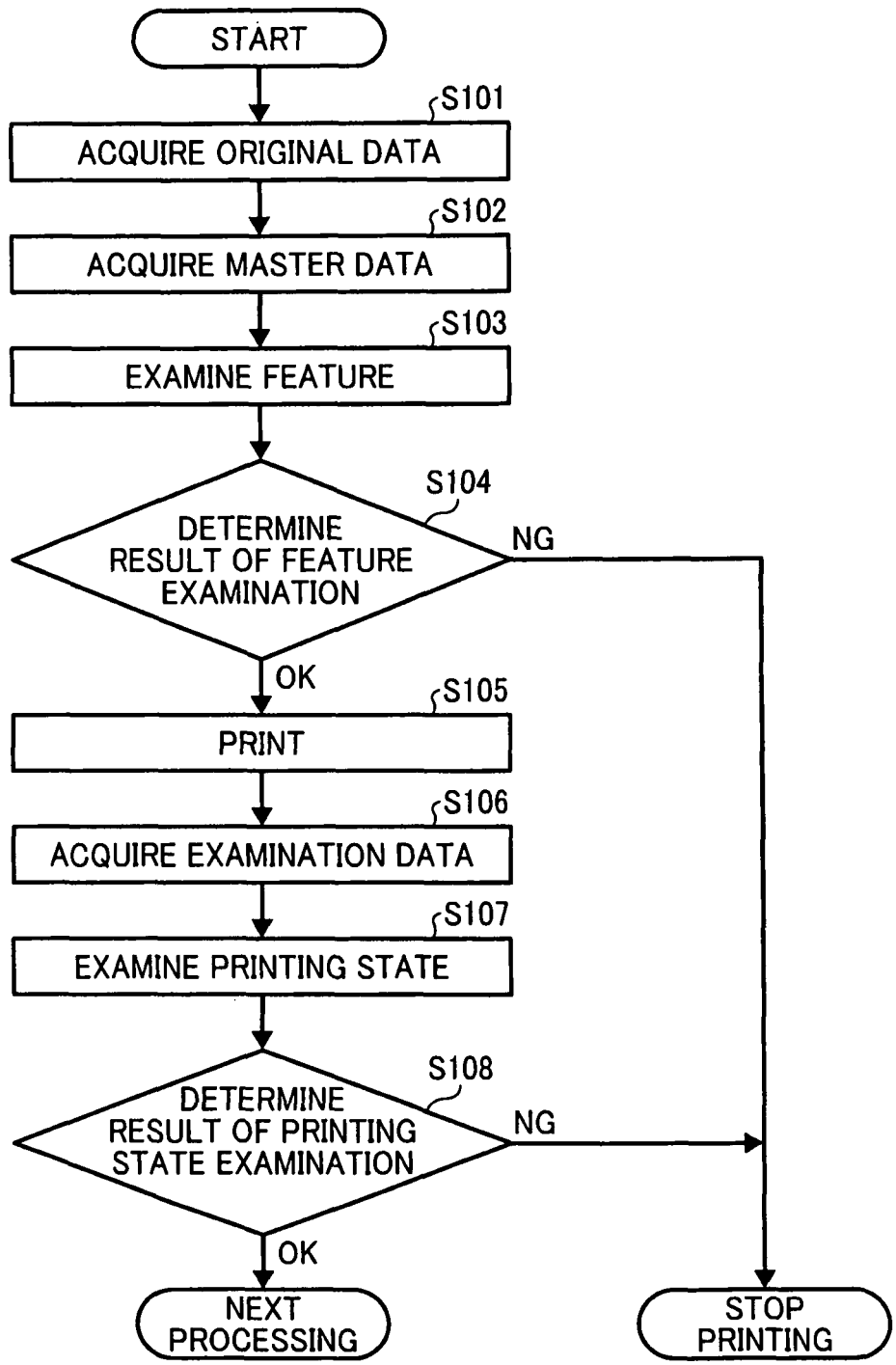
FIG. 15 is a flowchart of a procedure of a printed matter examination process of the printed matter examination system according to the second embodiment.

The flow of the printed matter examination process of the printed matter examination system that is configured as described above will be described below. FIG. 15 is a flowchart of a procedure of the printed matter examination process of the printed matter examination system according to the second embodiment.

The original data acquiring unit 111 acquires RIP original data from the original data DB 3000 (step S101). The master data acquiring unit 112 acquires master data (step S102). The feature examination unit 1114 examines the feature of the master data and the feature of the RIP original data by the feature examination process (step S103). For example, the feature examination unit 1114 compares the pixel values of the master data with the pixel values of the RIP original data in order to determine whether the original data is correct.

The feature examination unit 1114 determines the result of the examination by the feature examination process (step S104). The feature examination unit 1114 determines that the original data is correct when the value of the differences between the pixels of the master data and the pixels of the RIP original data is within the range of the predetermined threshold (OK at step S104) or determines that the original data is incorrect when the difference value is outside of the range of the predetermined threshold (NG at step S104).

When the feature examination unit 1114 determines the original data to be correct (OK at step S104), the printing controller 115 prints the master data (step S105).

When the feature examination unit 1114 determines that the original data is incorrect (NG at step S104), the printing controller 115 cancels printing. In this case, no examination of the printing state is conducted and the master data is excluded from the data to be examined.

The processes from steps S106 to S108 are similar to the processes from step S6 to step S8 in the flowchart of the printed matter examination process in FIG. 10 described in the first embodiment.

As described above, according to the second embodiment, the printing content is examined using the features, and master data can be examined using the method that additionally fits the conversion method.

According to the second embodiment, data near the border between correct and incorrect ranges that is determined to be required to be re-examined is re-examined, which allows for a highly accurate examination.

Third Embodiment

In the first embodiment, the printing state is examined by comparing examination data with master data. In a third embodiment of the present invention, the printing state is examined by comparing examination data with data that is generated from the master data and serves as an examination reference.

Figure 16:
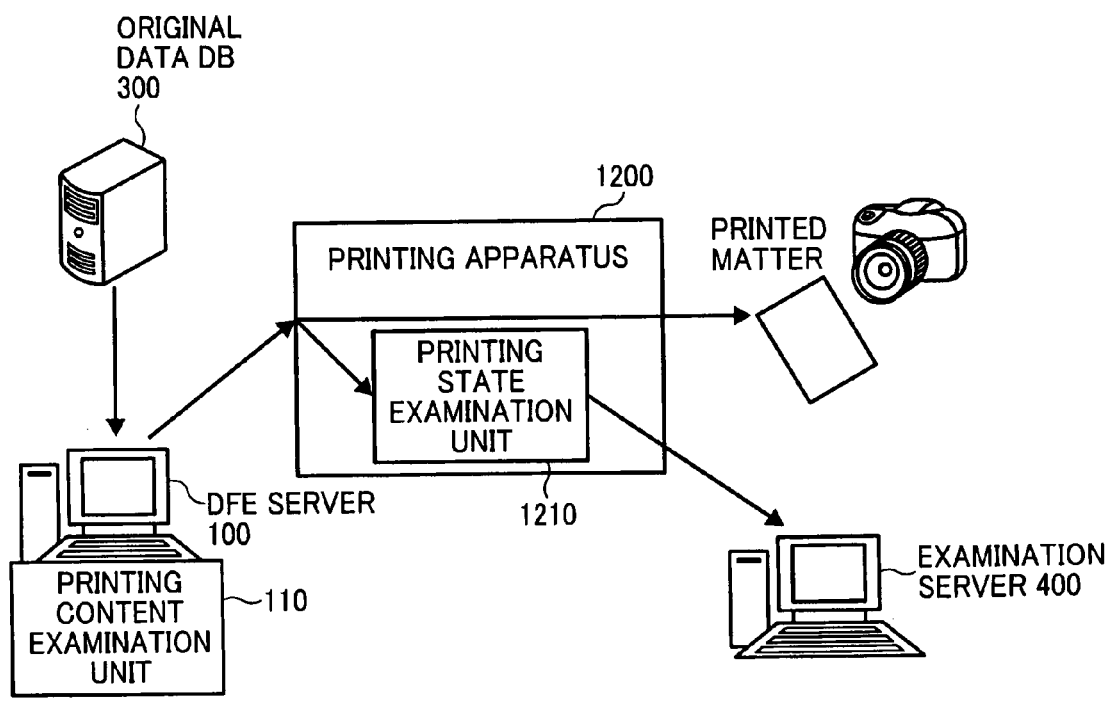
FIG. 16 is a schematic diagram of a printed matter examination system according to a third embodiment of the present invention.

FIG. 16 is a schematic diagram of a printed matter examination system according to the third embodiment. As shown in FIG. 16, the printed matter examination system includes the DFE server 100, a printing apparatus 1200, the original data DB 300, and the examination server 400, which are all connected via a network.

Figure 17:
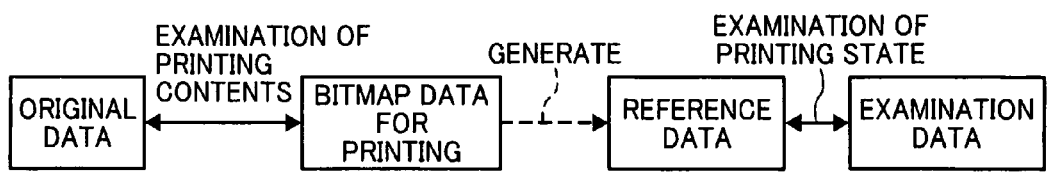
FIG. 17 is a diagram of an overview of the flow of a printed matter examination process of the printed matter examination system according to the third embodiment.

FIG. 17 is a diagram of an overview of the flow of the printed matter examination process of the printed matter examination system according to the third embodiment. As shown in FIG. 17, the printing content examination unit 110 collates bitmap data for printing with original data that is acquired from the original data DB 300 in order to examine the printing content. A printing state examination unit 1210 then generates reference data from data obtained by reading a printed matter and compares examination data with the reference data in order to examine the printing state. The reference data is generated from master data so as to serve as a reference for examination and has an image quality equivalent to that of data obtained by capturing an image of a printed matter.

The printing apparatus 1200 prints the bitmap data for printing. The printing apparatus 1200 includes the printing state examination unit 1210 that examines the printing state.

The functions and configurations of the DFE server 100, the original data DB 300, and the examination server 400 are similar to those of the first embodiment.

Figure 18:
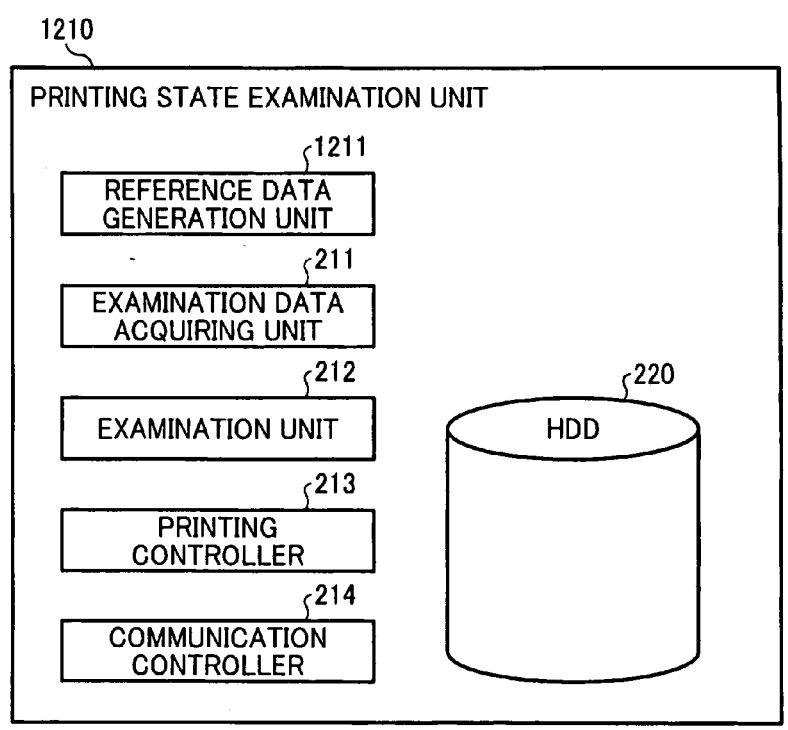
FIG. 18 is a block diagram of the configuration of a printing state examination unit according to the third embodiment.

FIG. 18 is a block diagram of the configuration of the printing state examination unit 1210 according to the third embodiment. As shown in FIG. 18, the printing state examination unit 1210 includes a reference data generation unit 1211, the examination data acquiring unit 211, the examination unit 212, the printing controller 213, the communication controller 214, and the HDD 220.

The reference data generation unit 1211 generates reference data by performing predetermined processes on the master data. The predetermined processes include an airbrushing process and a filtering process, such as anti-aliasing.

The configuration and the function of each unit other than the reference data generation unit 1211 are similar to those of the first embodiment.

Figure 19:
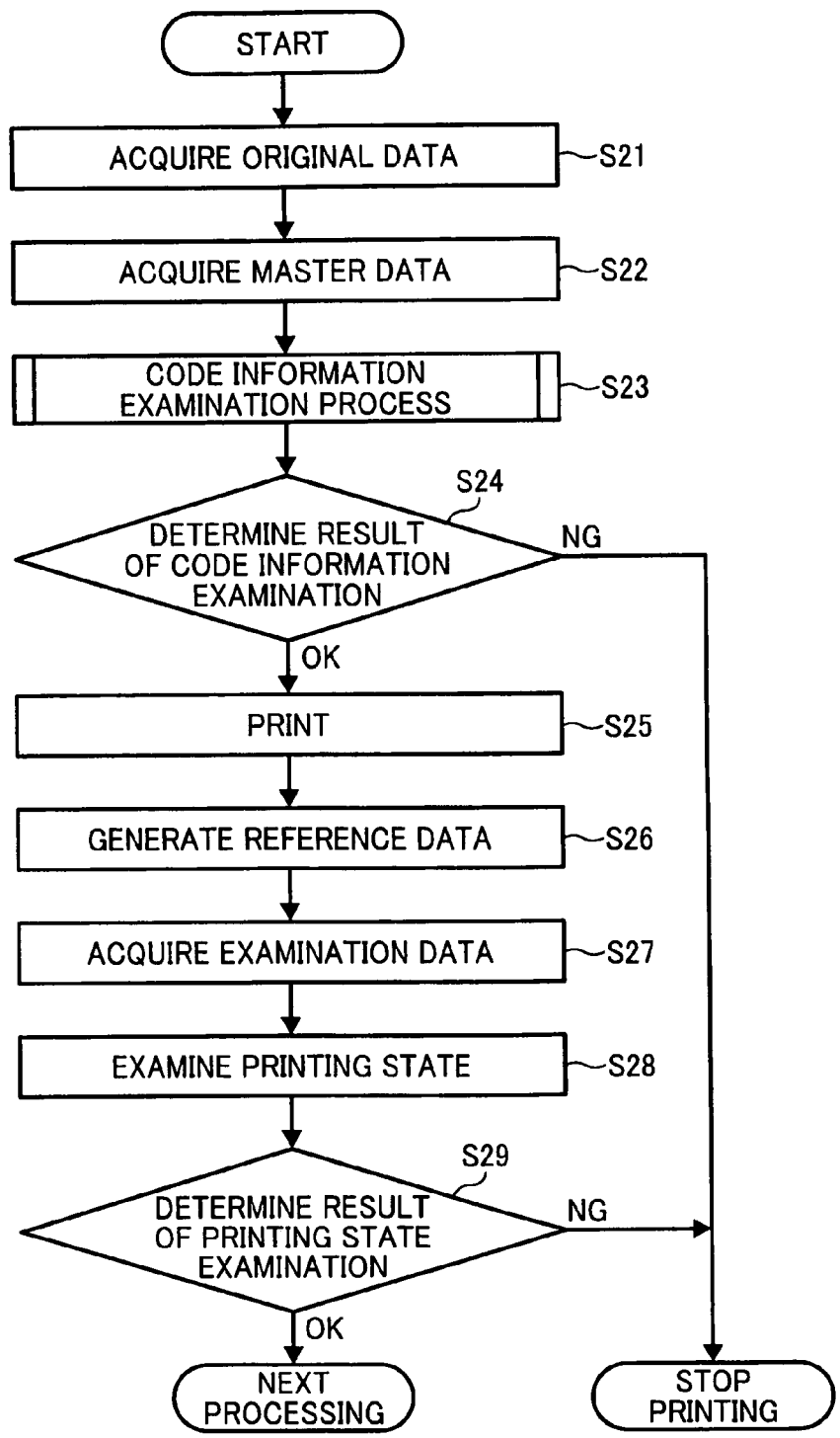
FIG. 19 is a flowchart of a procedure of a printed matter examination process of the printed matter examination system according to the third embodiment.

The flow of the printed matter examination process of the printed matter examination system configured as described above will be described below. FIG. 19 is a flowchart of a procedure of the printed matter examination process of the printed matter examination system according to the third embodiment.

Steps S21 to step S25 are similar to steps S1 to S5 in the flowchart of the printed matter examination process according to the first embodiment.

At step S26, the reference data generation unit 1211 generates reference data from master data by the predetermined processes (step S26). For example, when an airbrushing process is set, a process is performed in which the density values of a pixel of interest and pixels neighboring the pixel of interest (for example, 3×3 pixels) in the master data are weighted, the sum of the density values is calculated, and the value of the sum is set as a new density value of the pixel of interest. On the other hand, when an anti-aliasing process is set, the reference data generation unit 1211 performs a process for changing the color to be smooth such that the contours of the master data, which is digital data, are blended integrated with the background.

Steps S27 to S29 are similar to steps S6 to S8 in the flowchart of the printed matter examination process in the first embodiment.

In the third embodiment, the printing content examination unit 110 and the printing state examination unit 1210 that are realized as the printed matter examination system are described. As an alternative example, similar to the first embodiment, a configuration may be employed in which the printing content examination unit 110 and the printing state examination unit 1210 are realized as one printed matter examination apparatus.

As described above, according to the third embodiment, the examination data is compared with the reference data having an image quality equivalent to that of the data obtained by capturing an image of a printed matter, which prevents a printed matter that is correctly printed from being determined to be incorrect and allows for an efficient examination of a printed matter.

Figure 20:
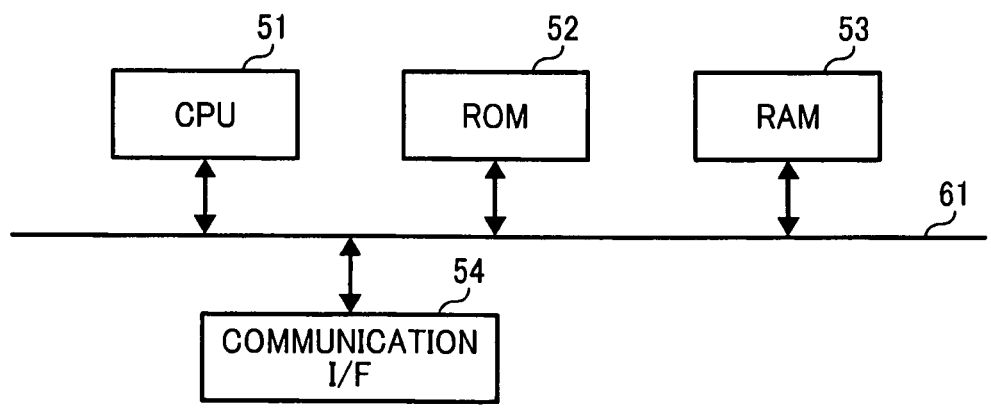
FIG. 20 is an explanatory diagram of the hardware configuration of a printing apparatus according to the third embodiment.

A hardware configuration of the printing apparatus according to the third embodiment will be described below with dereference to FIG. 20. FIG. 20 is an explanatory view of the hardware configuration of the printing apparatus according to the third embodiment.

The printing apparatus according to the third embodiment includes a control device, such as a CPU (central processing unit) 51; storage devices, such a ROM (read only memory) 52, and a RAM (random access memory) 53; a communication I/F 54 that connects to the network to establish communications; and a bus 61 that connects each unit.

The printed matter examination program that is executed by the printing apparatus according to the third embodiment is previously installed in the ROM 52 or the like.

The printed matter examination program that is executed by the printing apparatus according to the third embodiment may be configured to be provide as being recorded in a computer-readable storage medium, such as a CD-ROM (compact disk read only memory), an FD (flexible disk), a CD-R (compact disk recordable), or a DVD (digital versatile disk).

Alternatively, the printed matter examination program that is executed by the printing apparatus according to the third embodiment may be stored in a computer that is connected to a network, such as the Internet, such that the program can be downloaded via the network. The printed matter examination program that is executed by the printing apparatus according to the third embodiment may be provided or distributed via a network, such as the Internet.

The printed matter examination program that is executed by the printing apparatus according to the third embodiment causes the computer to serve as each unit of the above-described printing apparatus (the original data acquiring unit, the master data acquiring unit, the code information recognition unit, the code information examination unit, the printing controller, the examination data acquiring unit, and the examination unit). In the computer, the CPU 51 can read the printed matter examination program from the computer-readable storage medium to the main storage device and execute the printed matter examination program.

The printed matter examination apparatus according to the third embodiment may be realized as a multi-functional machine. FIG. 21 is a block diagram of a hardware configuration of a multi-functional machine including the printed matter examination apparatus. As shown in FIG. 21, the multi-functional machine has a configuration in which a controller 10 and an engine 60 are connected to each other via a PCI (peripheral component interface) bus. The controller 10 is a controller that controls the multi-functional machine and controls drawing, communications, and inputs to and outputs from an operation unit (not shown). The engine 60 is, for example, a printer engine that is connectable to the PCI bus. For example, the engine 60 is a black/white plotter, a single-drum color plotter, a four-drum color plotter, a scanner, or a facsimile unit. The engine 60 includes an image processing unit for error dispersion or gamma conversion in addition to a unit called an engine unit, such as a plotter.

The controller 10 includes a CPU 11, a north bridge (NB) 13, a system memory (MEM-P) 12, a south bridge (SB) 14, a local memory (MEM-C) 17, an ASIC (application specific integrated circuit) 16, and a hard disk drive (HDD) 18. The NB 13 and the ASIC 16 are connected via a AGP (accelerated graphics port) bus 15. The MEM-P 12 further includes a ROM (read only memory) 12a and a RAM (random access memory) 12b.

The CPU 11 controls the multi-functional machine. The CPU 11 includes a chip set consisting of the NB 13, the MEM-P 12, and the SB 14 and is connected to other devices via the chip set.

The NB 13 is a bridge for connecting the CPU 11 to the MEM-P 12, the SB 14, and the AGP 15 and includes a memory controller that controls writing in the MEM-P 12, a PCI master, and an AGP target.

The MEM-P 12 is a system memory used as a memory for storing programs and data, a memory for executing the programs or decompressing the data, or a drawing memory for a printer. The MEM-P 12 includes a ROM 12a and a RAM 12b. The ROM 12a is a read-only memory used for storing programs and data. The RAM 12b is a rewritable and readable memory used as a drawing memory for a printer.

The SB 14 is a bridge for connecting the NB 13 to PCI devices or peripheral devices. The SB 14 is connected to the NB 13 via the PCI bus. The network interface (I/F) is also connected to the PCI bus.

The ASIC 16 is an IC (integrated circuit) for image processing that includes hardware components for image processing. The ASIC 16 serves as a bridge for connecting the AGP 15, the PCI bus, the HDD 18, and the MEM-C 17. The ASIC 16 includes a PCI target, an AGP master, an arbiter (ARB), a memory controller that controls the MEM-C 17, a plurality of DMACs (direct memory access controller) that rotates image data using hardware logic, and an PCI unit that transfers data via the PCI to the engine 60. An FCU (facsimile control unit) 30, a USB (universal serial bus) 40, and an IEEE 1394 (the institute of electrical and electronics engineers 1394) interface 50 are connected to the ASIC 16 via the PCI bus. An operation display unit 20 is connected directly to the ASIC 16.

The MEM-C 17 is a local memory that is used as a copy image buffer and a code buffer. The HDD 18 is storage for storing image data, programs, font data, and forms.

The AGP 15 is a bus interface for a graphic accelerator card developed for accelerating graphic processes. The AGP 15 accelerates the graphic accelerator cord by directly accessing the MEM-P 12 at a high throughput.

The printed matter examination program that is executed by the printing apparatus according to the third embodiment is provided as being installed in the ROM beforehand.

The printed matter examination program that is executed by the printing apparatus according to the third embodiment may be provided as being recorded in a computer-readable recording medium, such as a CD-ROM, an FD, a CD-R, a DVD, or other computer-readable recording medium, in a format that can be installed or in a executable format.

Furthermore, the printed matter examination program that is executed by the printing apparatus according to the third embodiment may be provided in a way that it is stored in the computer connected to a network, such as the Internet, so as to be downloaded via the network. The printed matter examination program that is executed by the printing apparatus according to the third embodiment may be provided or distributed via a network, such as the Internet.

The printing examination program that is executed by the printing apparatus according to the third embodiment may be configured as a module including each of the above-described units (the original data acquiring unit, the master data acquiring unit, the code information recognition unit, the code information examination unit, the printing controller, the examination data acquiring unit, and the examination unit). As a hardware configuration, the CPU (processor) reads the printed matter examination program from the ROM and executes the program so that the above-described units are loaded in the main storage device, thereby generating, in the main storage device, the original data acquiring unit, the master data acquiring unit, the code information recognition unit, the code information examination unit, the printing controller, the examination data acquiring unit, and the examination unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A printed matter examination apparatus comprising:
 a master data acquiring unit configured to generate master data containing converted code information by laying out groups of pixels representing unconverted code information contained within original data according to positional information associated with the original data, the master data being data for printing;
 a code information acquiring unit configured to acquire the unconverted code information, the unconverted code information being a unique identifier of information contained within the original data;

a code information recognition unit configured to recognize the converted code information from the acquired master data using a dictionary associated with a determined data type of the converted code information, the converted code information being a unique identifier of information contained within the master data; and a code information examination unit configured to compare the converted code information recognized by the code information recognition unit with the acquired unconverted code information and determine that the converted code information is incorrect when the converted code information is not identical to the unconverted code information.

2. The printed matter examination apparatus according to claim 1, further comprising:

a printing controller configured to cancel printing of the master data when the converted code information is determined to be incorrect.

3. The printed matter examination apparatus according to claim 1, further comprising:

a printing controller configured to print the master data when the converted code information is not determined to be incorrect.

4. The printed matter examination apparatus according to claim 3, further comprising:

an examination data acquiring unit configured to acquire examination data that is an image data obtained by capturing an image of a recording medium on which the master data is printed; and a printing state examination unit configured to compare the acquired examination data with the master data and determine that the examination data is incorrect when the examination data is not identical to the master data.

5. The printed matter examination apparatus according to claim 4, wherein the printing state examination unit calculates either a value of a difference between a pixel value of the examination data and a pixel value of the master data, or a value of a difference between a feature extracted from the examination data and a feature extracted from the master data, compares the difference with a predetermined threshold, and determines that the examination data is incorrect when the value of the difference is larger than the threshold.

6. The printed matter examination apparatus according to claim 4, further comprising:

a reference data generating unit configured to generate reference data that serves as a reference for the comparison, wherein the master data is image data that is converted by a predetermined process, the printing state examination unit compares the acquired examination data with the generated reference data and determines that the acquired examination data is incorrect when the examination data is not identical to the generated reference data.

7. The printed matter examination apparatus according to claim 1, wherein the converted code information is one or more of unique characters, numbers identifying a unique piece of data and numbers identifying a unique image.

8. The printed matter examination apparatus according to claim 1, wherein the code information recognition unit comprises:

a type determination unit configured to determine the data type of the master data; and one or more recognition units configured to recognize the converted code information by comparing the converted code information to information contained in the dictionary chosen based on the determined data type.

9. A printed matter examination method comprising:

generating master data containing converted code information by laying out groups of pixels representing unconverted code information contained within original data according to positional information associated with the original data, the master data being data for printing;

acquiring the unconverted code information, the unconverted code information being a unique identifier of information contained within the original data;

recognizing the converted code information from the acquired master data using a dictionary associated with a determined data type of the converted code information, the converted code information being a unique identifier of information contained within the master data; and comparing the converted code information recognized at the recognizing with the acquired unconverted code information and determining that the converted code information is incorrect when the converted code information is not identical to the unconverted code information.

10. The method of claim 9, wherein the converted code information is one or more of unique characters, numbers identifying a unique piece of data and numbers identifying a unique image.

11. The method of claim 9, wherein the recognizing the converted code information comprises:

determining the data type of the master data; and recognizing the converted code information by comparing the converted code information to information contained in the dictionary chosen based on the determined data type.

12. A printed matter examination system comprising:

a server including, a master data acquiring unit configured to generate master data containing converted code information by laying out groups of pixels representing unconverted code information contained within original data according to positional information associated with the original data, the master data being data for printing, a code information acquiring unit configured to acquire the unconverted code information, the unconverted code information being a unique identifier of information contained within the original data, a code information recognition unit configured to recognize the converted code information from the acquired master data using a dictionary associated with a determined data type of the converted code information, the converted code information being a unique identifier of information contained within the master data, and a code information examination unit configured to compare the converted code information recognized by the code information recognition unit with the acquired unconverted code information and determine that the converted code information is incorrect when the converted code information is not identical to the unconverted code information; and a printing apparatus including, an examination data acquiring unit configured to acquire examination data that is an image data obtained by capturing an image of a recording medium on which the master data is printed, and a printing state examination unit configured to compare the acquired examination data with the master data and determine that the examination data is incorrect when the examination data is not identical to the master data.

13. The system of claim 12, wherein the converted code information is one or more of unique characters, numbers identifying a unique piece of data and numbers identifying a unique image.

14. The system of claim 12, wherein the code information recognition unit comprises:

a type determination unit configured to determine the data type of the master data; and one or more recognition units configured to recognize the converted code information by comparing the converted code information to information contained in the dictionary chosen based on the determined data type.

* * * * *